(12) United States Patent
Yang et al.

(10) Patent No.: US 10,674,402 B2
(45) Date of Patent: Jun. 2, 2020

(54) LOAD BALANCING SYSTEM WITH AN ACCESS CONTROLLER IN THE FIELD OF COMMUNICATION TECHNOLOGY

(71) Applicants: Yi Sun, Beijing (CN); Linju Yang, Beijing (CN); Haihua Yu, Beijing (CN); Chaofeng Li, Beijing (CN)

(72) Inventors: Tian Yang, Beijing (CN); Yi Sun, Beijing (CN); Linju Yang, Beijing (CN); Haihua Yu, Beijing (CN); Chaofeng Li, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 273 days.

(21) Appl. No.: 15/910,245

(22) Filed: Mar. 2, 2018

(65) Prior Publication Data
US 2018/0255480 A1    Sep. 6, 2018

(30) Foreign Application Priority Data

Mar. 3, 2017 (CN) .......................... 2017 1 0123068

(51) Int. Cl.
| | |
|---|---|
| *H04W 28/08* | (2009.01) |
| *H04W 76/25* | (2018.01) |
| *H04W 76/10* | (2018.01) |
| *H04W 36/22* | (2009.01) |
| *H04W 84/12* | (2009.01) |

(52) U.S. Cl.
CPC .......... *H04W 28/08* (2013.01); *H04W 36/22* (2013.01); *H04W 76/10* (2018.02); *H04W 76/25* (2018.02); *H04W 84/12* (2013.01)

(58) Field of Classification Search
CPC ..... H04W 28/08; H04W 36/22; H04W 76/10; H04W 76/25; H04W 84/12
See application file for complete search history.

(56) References Cited

U.S. PATENT DOCUMENTS

| | | | |
|---|---|---|---|
| 2002/0181394 A1* | 12/2002 | Partain | H04L 41/0896 370/229 |
| 2008/0225718 A1* | 9/2008 | Raja | H04L 67/1012 370/235 |
| 2009/0290489 A1* | 11/2009 | Wang | H04W 28/06 370/230 |

(Continued)

*Primary Examiner* — Mewale A Ambaye
(74) *Attorney, Agent, or Firm* — IPUSA, PLLC

(57) ABSTRACT

A load balancing method, an access controller and a load balancing system are provided. The method includes receiving load status association information from a plurality of APs in a wireless local area network, respectively, the load status association information including load information and connectivity information, and the connectivity information being information for indicating one or more UEs that can be connected to an AP corresponding to the load status association information; determining, based on the load status association information, load statuses of the APs, and obtaining, using the load status association information, a load balancing connection scheme for balancing loads of the APs, when the load statuses satisfy a predetermined condition; and determining, based on the load balancing connection scheme, a correspondence relation between a specific UE and one of the plurality of APs to connect a UE and a corresponding AP.

8 Claims, 5 Drawing Sheets

```
┌─────────────────────────────────────────────────────┐
│ RECEIVE LOAD STATUS ASSOCIATION INFORMATION FROM    │
│   WIRELESS ACCESS POINTS IN WIRELESS LOCAL AREA     │
│  NETWORK, RESPECTIVELY, LOAD STATUS ASSOCIATION     │
│    INFORMATION INCLUDING LOAD INFORMATION AND       │──S201
│      CONNECTIVITY INFORMATION, AND CONNECTIVITY     │
│  INFORMATION BEING INFORMATION FOR INDICATING UE    │
│  THAT CAN CONNECTED TO AP CORRESPONDING TO LOAD     │
│             STATUS ASSOCIATION INFORMATION          │
└─────────────────────────────────────────────────────┘
                          │
                          ▼
┌─────────────────────────────────────────────────────┐
│ DETERMINE LOAD STATUSES OF ACCESS POINTS BASED ON   │
│    LOAD STATUS ASSOCIATION INFORMATION, AND OBTAIN  │
│   LOAD BALANCING CONNECTION SCHEME FOR BALANCING    │──S202
│       LOADS OF ACCESS POINTS USING LOAD STATUS      │
│     ASSOCIATION INFORMATION, WHEN LOAD STATUSES     │
│            SATISFY PREDETERMINED CONDITION          │
└─────────────────────────────────────────────────────┘
                          │
                          ▼
┌─────────────────────────────────────────────────────┐
│    DETERMINE CORRESPONDENCE RELATION BETWEEN        │
│      SPECIFIC UE AND ONE OF ACCESS POINTS, SO THAT  │──S203
│       CONNECTION BETWEEN UE IN WIRELESS LOCAL AREA  │
│   NETWORK AND AP CORRESPONDING TO UE IS ESTABLISHED │
└─────────────────────────────────────────────────────┘
```

(56) References Cited

U.S. PATENT DOCUMENTS

| | | | |
|---|---|---|---|
| 2012/0270553 A1* | 10/2012 | Ha | H04W 36/22 |
| | | | 455/438 |
| 2016/0165484 A1* | 6/2016 | Cui | H04W 28/08 |
| | | | 370/235 |
| 2016/0165532 A1* | 6/2016 | Nagasaka | H04W 48/16 |
| | | | 370/338 |
| 2017/0134970 A1* | 5/2017 | Zhang | H04W 24/02 |
| 2018/0234344 A1* | 8/2018 | Chen | H04L 29/08 |

* cited by examiner

FIG.3

| Conn$_{u,a}$ | AP21 | AP22 | AP23 | AP24 |
|---|---|---|---|---|
| UE31 | 1 | 0 | 1 | 0 |
| UE32 | 0 | 1 | 0 | 1 |
| UE33 | 0 | 1 | 1 | 1 |
| UE34 | 1 | 0 | 1 | 1 |
| ... | 0 | 1 | 1 | 1 |
| | ... | ... | ... | ... |

FIG.4

| Bw$_u$ | 4 | 5 | 3 | 1 | 5 | 6 | 7 | 1 | 5 |
|---|---|---|---|---|---|---|---|---|---|
| | UE31 | UE32 | UE33 | | | ......... | | | |

FIG.5

| Capa$_a$ | 30 | 30 | 20 | 30 |
|---|---|---|---|---|
| | AP21 | AP22 | AP23 | AP24 |

FIG.6

| Alloc'$_{u,a}$ | AP21 | AP22 | AP23 | AP24 |
|---|---|---|---|---|
| UE31 | 4 | 0 | 0 | 0 |
| UE32 | 0 | 5 | 0 | 0 |
| UE33 | 0 | 3 | 0 | 0 |
| UE34 | 0 | 0 | 1 | 0 |
| ... | 0 | 0 | 0 | 5 |
| | ... | ... | ... | ... |

FIG.7

| Prior$_u$ | High | Low | High | Low | High | ... |
|---|---|---|---|---|---|---|
| | UE31 | UE32 | UE33 | UE34 | UE35 | |

FIG.8

| | AP21 | AP22 | AP23 | AP24 | | | |
|---|---|---|---|---|---|---|---|
| UE31 | 1 | 0 | 1 | 0 | × | 4 | |
| UE32 | 0 | 1 | 0 | 1 | × | 5 | |
| UE33 | 0 | 1 | 1 | 1 | × | 3 | |
| UE34 | 1 | 0 | 1 | 1 | × | 1 | |
| UE35 | 0 | 1 | 1 | 1 | | 5 | |
| ... | ... | ... | ... | ... | | ... | |

=

| 4 | 0 | 4 | 0 |
|---|---|---|---|
| 0 | 5 | 0 | 5 |
| 0 | 3 | 3 | 3 |
| 1 | 0 | 1 | 1 |
| 0 | 5 | 5 | 5 |
| ... | ... | ... | ... |

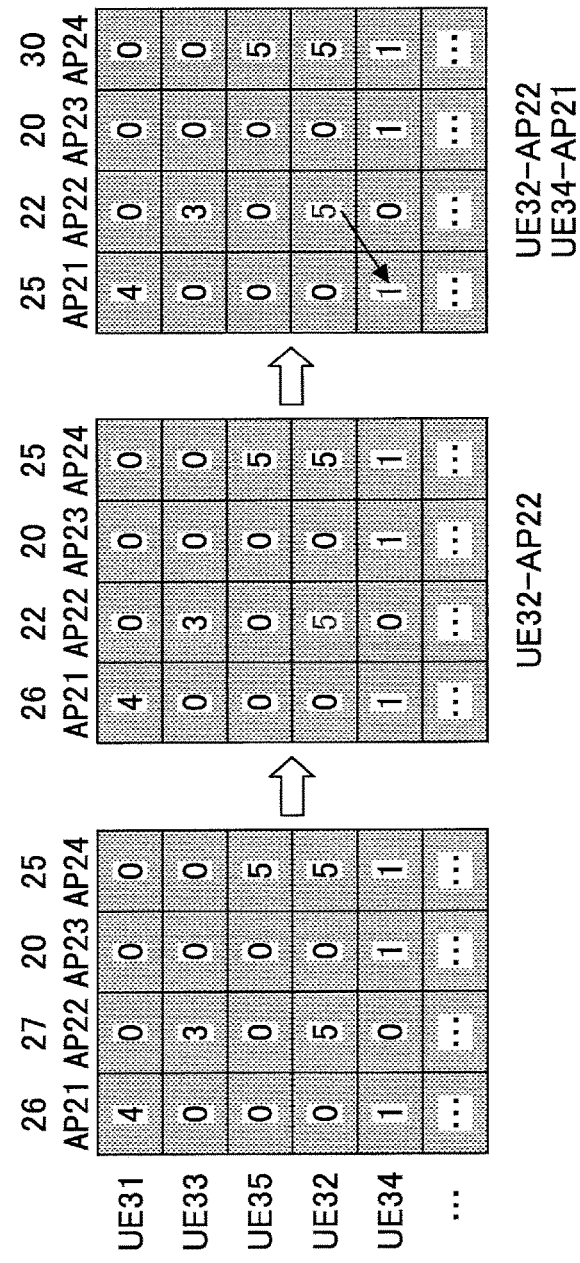

LOAD BALANCING SYSTEM WITH AN ACCESS CONTROLLER IN THE FIELD OF COMMUNICATION TECHNOLOGY

CROSS-REFERENCE TO RELATED APPLICATIONS

The present application claims priority under 35 U.S.C. § 119 to Chinese Application No. 201710123068.2 filed on Mar. 3, 2017, the entire contents of which are incorporated herein by reference.

BACKGROUND OF THE INVENTION

1. Field of the Invention

The present invention relates to the field of communication technology, and specifically, a load balancing method, an access controller and a load balancing system in the field of communication technology.

2. Description of the Related Art

Recently, wireless technology becomes important in daily life, and an infrastructure for providing wireless network service is widely established. For example, in a large-scale convention center with one or more wireless access points (hereinafter referred to as "APs"), the APs may be controlled by an access controller (hereinafter referred to as "AC"). By such deployment, it is possible to support the access of a large number of user equipments (hereinafter referred to as "UEs"), and it is also possible to support the use of a network by the UEs and roaming service.

However, when load distribution of APs is not be well balanced, there may be some APs to which almost no UE is associated, and other APs may be intensively connected to a large number of UEs. As a result, the usage rate of a wireless network decreases, the user experience deteriorates, and package loss and retransmission of data occur frequently.

Accordingly, IEEE 802.11k standard was proposed, and a mechanism for solving the load balancing problem was substantially proposed in such a standard. Specifically, a UE selects an AP with the strongest signal to associate to the AP, and the AP refuses an access request of the UE if the AP is in an overload status. In the existing technology, a Cisco Aggressive Load Balancing mechanism that balances loads based on the number of UEs on an AP, and a Juniper Network system (MSS-wireless operating system) that allocates accessed UEs on an AP with the lightest load were proposed.

SUMMARY OF THE INVENTION

According to an aspect of the present invention, a load balancing method applied to an access controller is provided. The load balancing method includes receiving load status association information from a plurality of wireless access points (APs) in a wireless local area network, respectively, the load status association information including load information and connectivity information, and the connectivity information being information for indicating one or more user equipments (UEs) that can be connected to an AP corresponding to the load status association information; determining, based on the load status association information, load statuses of the APs, and obtaining, using the load status association information, a load balancing connection scheme for balancing loads of the APs, when the load statuses satisfy a predetermined condition; and determining, based on the load balancing connection scheme, a correspondence relation between a specific UE and one of the plurality of APs, so that a connection between a UE in the wireless local area network and an AP corresponding to the UE is established.

According to another aspect of the present invention, an access controller includes a receiving unit configured to receive load status association information from a plurality of wireless access points (APs) in a wireless local area network, respectively, the load status association information including load information and connectivity information, and the connectivity information being information for indicating one or more user equipments (UEs) that can be connected to an AP corresponding to the load status association information; a balancing unit configured to determine, based on the load status association information, load statuses of the APs, and obtain, using the load status association information, a load balancing connection scheme for balancing loads of the APs, when the load statuses satisfy a predetermined condition; and a connecting unit configured to determine, based on the load balancing connection scheme, a correspondence relation between a specific UE and one of the plurality of APs, so that a connection between a UE in the wireless local area network and an AP corresponding to the UE is established.

According to another aspect of the present invention, a load balancing system includes the above access controller and the plurality of APs.

BRIEF DESCRIPTION OF THE DRAWINGS

The above and other objects, features and advantages of the present invention will be further clarified by describing in detail embodiments of the present invention in combination with the drawings.

FIG. 3 is a schematic diagram illustrating a connectivity matrix obtained by an access controller according to an embodiment of the present invention;

FIG. 4 is a schematic diagram illustrating a UE bandwidth vector according to an embodiment of the present invention;

FIG. 5 is a schematic diagram illustrating an AP bandwidth capacity vector according to an embodiment of the present invention;

FIG. 6 is a schematic diagram illustrating a matrix indicating current UE connection information according to an embodiment of the present invention;

FIG. 7 is a schematic diagram illustrating a priority vector according to an embodiment of the present invention;

FIG. 8 is a schematic diagram illustrating a process of establishing a base matrix according to an embodiment of the present invention;

FIG. 9 is a schematic diagram illustrating a process of modifying a base matrix based on a priority vector according to an embodiment of the present invention;

FIG. 10 is a schematic diagram illustrating an enumeration process based on a constructed base matrix according to an embodiment of the present invention;

DESCRIPTION OF THE EMBODIMENTS

In the following, a load balancing method, an access controller and a load balancing system according to embodiments of the present invention will be described in detail with reference to the accompanying drawings. In the accompanying drawings, the same reference signs represent the same elements. Note that the embodiments described herein are merely illustrative and should not be interpreted as limiting the scope of the invention.

The wireless LANs (Local Area Networks) may be roughly classified into the following classes. In a wireless LAN of IEEE LAN standard 802.11, some infrastructures with a fixed geographical location for providing network access are required. Similarly, in a wireless LAN of 802.16 standard, a wireless sensor network, a wireless Mesh and the like, some infrastructures with a fixed geographical location for providing network access are also required. Furthermore, in a wireless LAN based on the Bluetooth technology such as a wireless ad hoc network, no infrastructure with a fixed geographical location is required, a wireless network is formed among wireless equipments to connection the wireless equipments, and such a network is commonly used in military field or the like where high mobility is required. Wireless LANs according to embodiments of the present invention may be applied to wireless LANs with various configurations where a lower layer network is not limited, and include but are not limited to 802.11 protocol group.

Figure 1:
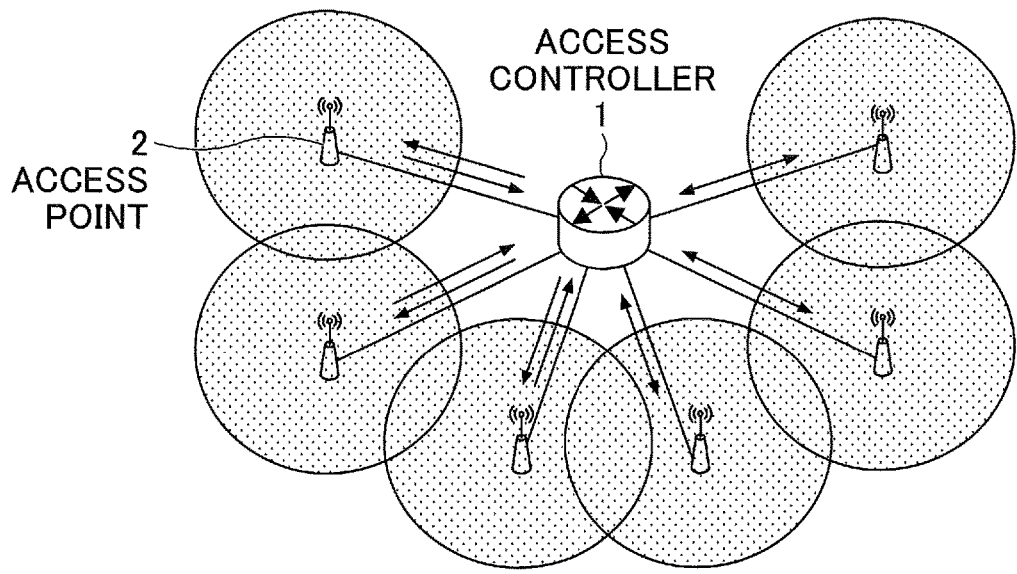
FIG. 1 is a schematic diagram illustrating connection between an access controller and a plurality of access points (APs)

In the embodiments of the present invention, an example of a wireless LAN of a network facility with a fixed geographical location under 802.11 standard will be mainly described. FIG. 1 is a schematic diagram illustrating connection between an access controller (AC) 1 and a plurality of access points (APs) 2. As shown in FIG. 1, the APs 2 provide capability of at least one user equipment (UE) for accessing the network, and a coverage area of the wireless network can be extended by at least one antenna of each of the APs 2 so that the UE can receive a signal and associate to the network. The UE may be a mobile equipment with an interface of the wireless network. The AC 1 executes centralized control, collects information of the UEs from the APs 2, and transmits an instruction to adjust the power or the intensity of signals of the APs 2, directions of the APs 2 or the like. The AC 1 may be different depending on different functions. The AC 1 collects association information on APs 2 to obtain a topology map of the whole network. Here, the relation between APs 2 and AC 1 may be a multiple-to-one relation. This means that the AP 2 can only controlled and associated by one AC 1. Although the AP 2 may be connected to a network (such as the Internet) in a wired manner, transmission occurring between the AP 2 and the UE may be wireless. A set of a single AP 2 and its coverage area become a basic service set (BSS). In FIG. 1, the AC 1 collects the information of the UE from the AP 2, calculates load allocation status, stores a corresponding load connection scheme in the AC 1, and sends it to the corresponding AP 2 at an appropriate time. As shown in FIG. 1, there may be intersection regions (overlapping portions of coverage areas around the AP 2) between the APs 2, and the UE may roam between intersecting regions and non-intersecting regions.

In the embodiments of the present invention, "association" refers to a connection relation between a UE and an AP. Once a UE is associated or connected to an AP, the UE and the AP will exchange information such as a dialog private key, channel usage and a bandwidth. Note that a UE can only be associated to one AP at the same time. Furthermore, in the embodiments of the present invention, "load" refers to a total bandwidth provided to UEs on an AP, and it is determined based on priority of a UE whether the UE can be associated or be handed over from an AP to another AP.

It is very important to balance power usage and route efficiency in a wireless LAN, due to the limited access capability of distributed network equipments and the need for high mobility in a wireless network. In particular, overload of an AP and load imbalance within a global area easily occur in a case where the UE roams, accordingly the normal use of the wireless LAN by a user is affected.

Furthermore, there is a certain limitation in the above-mentioned existing technologies, namely, network allocation is performed when a UE has just entered a wireless network, and connection statuses in actual application scenes of UEs and APs are not taken into consideration. Thus, there is a technical problem of uniformly allocating loads over a global area in the existing technologies.

In view of the above problem of the conventional technology, embodiments of the present invention have an object to provide a load balancing method, an access controller and a load balancing system that can provide an association scheme between one or more UEs and a plurality of APs for balancing loads of the APs in a global area.

[Load Balancing Method]

Figure 2:
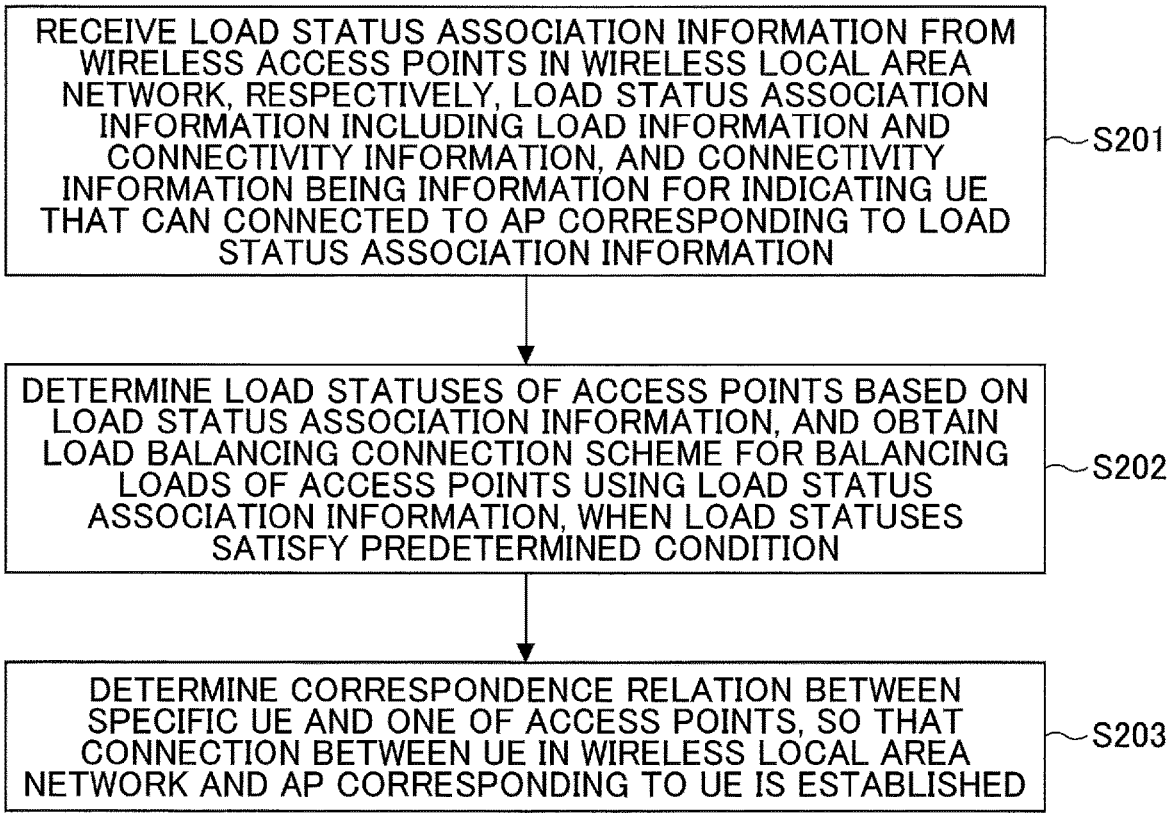
FIG. 2 is a flowchart illustrating a load balancing method according to an embodiment of the present invention.

The present embodiment provides a load balancing method. FIG. 2 is a flowchart illustrating a load balancing method according to an embodiment of the present invention. The load balancing method of the present embodiment is applied to an access controller.

In the present embodiment, the load balancing method may be used in various locations, such as a large-scale convention center, an office or a public open area. In any one of the above locations, a UE may be a mobile wireless equipment or a laptop computer, and an AC (Access Controller) and an AP (Access Point) may be a series of infrastructures for providing network access at fixed locations.

As illustrated in FIG. 2, in step S201, an AC receives load status association information from a plurality of wireless APs in a wireless local area network, respectively. The load status association information includes load information and connectivity information. The connectivity information is information for indicating one or more UEs (User Equipments) that can be connected to an AP corresponding to the load status association information.

In this step, the AC receives load status association information related to each of the APs that transmitted by the AP. The interaction of information between the AC and the APs may be wireless or wired, and the interaction of the information may be realized via control frames of interaction. Preferably, considering that data stream in the wireless LAN may be unstable, the interaction of the information between the AC and the APs may be performed periodically, and a period is determined based on an actual usage scene and a specific distribution situation of the wireless LAN.

In the present embodiment, the load status association information transmitted by the AP includes the load information and the connectivity information. The connectivity information is information for indicating one or more UEs (User Equipments) that can be connected to an AP corresponding to the load status association information. The connectivity information may be collected by the information interaction between the APs and the UEs. In the same wireless LAN, the connectivity information may be obtained by considering signal intensities of the APs and access capabilities of the UEs in the wireless LAN, and may vary with the change of positions, statuses or the like of the UEs. The AP transmits, to the AC, the obtained information of UEs that can be connected to the AP, and the information of the UEs transmitted by the AP may be identification information of the UEs (such as an IMEI, a MAC address or the like). Accordingly, the AC collects the information of the UEs that can be connected to the AP transmitted by all of the APs (the connectivity information), and expresses the collected connectivity information by a connectivity matrix whose element is $Conn_{u,a}$, where u denotes a specific UE and a denotes a specific AP. For example, the connectivity matrix may be a matrix whose size is $|U|\times|A|$ and matrix element is 0 or 1, where A denotes a set of wireless access points a whose size is $|A|$, and U denotes a set of user equipments u whose size is $|U|$. As known from the following formula, the matrix element $Conn_{u,a}$ indicates whether a current UE can be associated to a corresponding AP.

$$Conn_{u,a} = \begin{cases} 1, & UE\ u\ \text{CAN BE ASSOCIATED TO } AP\ a \\ 0, & UE\ u\ \text{CANNOT BE ASSOCIATED TO } AP\ a \end{cases}$$

Preferably, the load information may include at least one of bandwidth occupied by one or more UEs in an AP corresponding to the load information, respectively, a bandwidth capacity of the AP, and current UE connection information. The current UE connection information indicates information of one or more UEs who currently establish connection with the AP. Because the load information collected by the AP is a load status at a certain time, the bandwidth occupied by the UE and the current UE connection information in the load information may vary based on a collection time of the load information.

Preferably, the bandwidth occupied by the UE may be denoted by $Bw_u$, and the bandwidth capacity provided by the AP a may be denoted by $Capa_a$. $Bw_u$ and $Capa_a$ may be relative values whose units are mutually unified. The AP obtains the bandwidth of a current UE based on the network usage status of the UE, and may report the bandwidth together with the own bandwidth capacity to the AC. The bandwidths of the UEs collected by the AC may be expressed by a UE bandwidth vector whose element is $Bw_u$, and the collected bandwidth capacities of the APs may be expressed by a bandwidth capacity vector whose element is $Capa_a$. The bandwidth capacity vector may be used to detect whether the AP is overloaded.

Preferably, the APs transmit the information of the currently associated UEs to the AC, and the AC aggregates the information, and generates, based on the aggregated information and the UE bandwidth information, a matrix whose element is $Alloc'_{u,a}$ for indicating the current UE connection information.

$$Alloc'_{u,a} = \begin{cases} Bw_u, & UE\ u\ \text{IS ASSOCIATED TO } AP\ a \\ 0, & UE\ u\ \text{IS NOT ASSOCIATED TO } AP\ a \end{cases}$$

In another embodiment of the present invention, the load information may also include priority information of one or more UEs. The priority information indicates whether the UE is a high-priority UE with a high priority. For example, when a UE uses an important network application such as a network video conference, the current UE may be set as a high-priority UE, and the UE cannot be handed over from an AP to which the UE is connected during a subsequent load balancing process, so that the user experience cannot be greatly affected. Such information may be collected and determined by the AP using any types of methods, such as negotiation between the AP and the UE, an access request type of the current UE, a type of an equipment or an application used by the UE or the like. Preferably, the priority information of the UE u may be denoted by $Prior_u$, the priority information of the UEs collected by the AC may be expressed by a priority vector whose element is $Prior_u$. It is not permitted to handover a UE with a high-priority High.

$$Prior_u = \begin{cases} High, & UE\ u\ \text{CANNOT BE HANDED OVER TO ANOTHER } AP \\ Low, & UE\ u\ \text{CAN BE HANDED OVER TO ANOTHER } AP \end{cases}$$

In step S202, the AC determines load statuses of the APs based on the load status association information, and obtains a load balancing connection scheme for balancing loads of the APs using the load status association information, when the load statuses satisfy a predetermined condition.

In this step, the AC may determine the load statuses of the APs based on a global association status of the wireless network obtained using the collected load status association information, and determine whether recalculate the load balancing connection scheme in the network. Preferably, the AC may determine whether to recalculate load connection based on a relation between the current UE connection information $Alloc'_{u,a}$ and the bandwidth capacity of the AP $Capa_a$. For example, it may be determined that an AP a is already overloaded, and the load balancing connection scheme in the network may be recalculated, when the AP a satisfies a predetermined condition $\Sigma_{u\in U}Alloc'_{u,a} > Capa_a$; and no operation need to be performed, when the AP a is not overloaded. In this way, overhead of UE handover and load balance can be balanced. Note that the above condition may be set based on the actual network situation. For example, the load connection of the wireless network may be recalculated, when a predetermined condition that the load of an AP a is greater than 90% of the bandwidth capacity thereof is satisfied. Alternatively, the load connection of the wireless network may be recalculated, when the load of an AP a is greater than 80% of the bandwidth capacity thereof and the load of an AP b is greater than 80% of the bandwidth capacity thereof.

In an embodiment of the present invention, when the load connection of the wireless network is recalculated, a base matrix may be established using the load status association information, and all available load connection schemes may be enumerated based on a predetermined constraint condition. Elements in the base matrix may be denoted by $Base_{u,a}$, and may be obtained by multiplying bandwidth $Bw_u$ of the UE u by a nonzero vector in a row corresponding to the UE u in the connectivity matrix Conn.

After generating the base matrix, all nonzero elements in the base matrix may be enumerated to obtain the available load connection scheme Alloc. The available load connection scheme is essentially a $|A|\times|U|$ matrix whose element $Alloc_{u,a}$ expresses a bandwidth currently occupied by the UE u on the AP a. From the above relation between the AP and the UE, it can be known that there is only at most one nonzero element for a row corresponding to each UE in the matrix.

In the enumeration process, it is necessary to set the predetermined constraint condition based on the connectivity information in the load status association information, so that the generated available load connection scheme can be used for association of all of the UEs. Accordingly, for an element $Alloc_{u,a}$ in an available load connection scheme corresponding to UE u and AP a, the predetermined constraint condition may be $\forall u \in U$, $a \in AP \wedge Alloc_{u,a} \neq 0$, $Conn_{u,a}=1$.

Furthermore, when there is a high-priority UE, the basic matrix may be modified based on the priority vector and be enumerated. Specifically, a row corresponding to the high-priority UE may be deleted from the base matrix; and a row corresponding to the high-priority UE may be copied from the Alloc' matrix and be inserted into the base matrix, and preferably it may be inserted into the top of the base matrix. The available load connection scheme is required to retain connection between the high-priority UE and an AP that currently connected to the UE; accordingly, in the process of enumeration calculation, in order to guarantee stable and sustainable connection and use of the high-priority UE in the wireless LAN, a search is performed based on the modified base matrix without changing the AP connected to the high-priority UE and the bandwidth occupied by the high-priority UE in the Alloc, namely the search is performed without changing the row inserted from the Alloc'. In an embodiment of the present invention, in order to simplify the calculation step, the calculation may be performed after subtracting the corresponding bandwidth occupied by the high-priority UE from the AP bandwidth capacity. Accordingly, the constraint condition based on the priority may be expressed as $\forall u \in U / \wedge Prior_u=High$, $Alloc_{u,a}=Alloc'_{u,a}$.

The enumeration of the available load connection scheme is completed based on the base matrix (or transform of the above base matrix). Here, the current bandwidth capacity of each AP may be expressed by a temporary vector Residue with |A| elements $Residue_a$, and an initial value of an element in the vector may be set as $Residue_a=Capa_a$. In the enumeration process of the available load connection scheme, the vector Residue may store and allocate the remaining bandwidth excluding the bandwidth occupied by the high-priority UE (in the case where the high-priority UE exists), and may subtract a corresponding bandwidth in the enumeration process of nonzero elements corresponding to the UEs in the base matrix.

Specifically, in an embodiment of the present invention, the enumeration process for searching all of the available load connection schemes may be as follows. For each of UE u, an AP a is selected under a condition that $Base_{u,a} \neq 0$, a value of an element in the vector Residue is set as $Residue'_a = Residue_a - Base_{u,a}$. If $Residue'_a \geq 0$, then proceed to enumerate a next UE u'. Otherwise, another AP a' is selected under a condition that $Base_{u,a} \neq 0$, and it is verified whether $Residue'_a \geq 0$ where $Residue'_a = Residue_a - Base_{u,a'}$, and so on. If no nonzero element corresponding to the UE u that satisfies the above condition from the base matrix, then return to a row corresponding to the previous UE u", and select another nonzero element that is different from all of the nonzero elements in the currently selected u" row (namely a recursion process).

After all of the available load connection schemes are obtained, the load balancing connection scheme for balancing loads of the APs may be selected. Preferably, a variance of the loads of the APs for each of the available load connection schemes may be calculated, the available load connection schemes may be sorted in an ascending order of the variances, and a load connection scheme whose variance is smallest may be selected as the load balancing connection scheme. Alternatively, an average value of the loads of the APs for each of the available load connection schemes may be calculated, and a load connection scheme whose average value of loads is smallest may be selected as the load balancing connection scheme.

The load balancing algorithm in the embodiments of the present invention may not depend on a protocol such as 802.11, so as to fit well with another load balance scheme based on access control.

In step S203, the AC determines a correspondence relation between a specific UE and one of the plurality of APs based on the load balancing connection scheme, so that a connection between a UE in the wireless LAN and an AP corresponding to the UE is established.

As described above, the load balancing connection scheme is a matrix indicating current bandwidth occupation of UEs u on an AP a, and there is only at most one nonzero element in a row corresponding to each UE in the matrix (each cell of the row corresponds to a specific AP). After obtaining the load balancing connection scheme, the AC may determine a correspondence relation between a specific UE and one of the plurality of APs based on the load balancing connection scheme and send a vector corresponding to each AP to the AP, and the vector indicates information of UEs connected to each AP designated by the AC, and bandwidths occupied by the UEs. The AP establishes a connection between a specific UE based on the indicated connection information, after receiving the corresponding vector of the load balancing connection scheme sent by the AC.

In an embodiment of the present invention, one or more load connection schemes may also be selected in an ascending order of the variances from the available load connection schemes other than the load balancing connection scheme, serving as alternative load connection schemes. After sorting the available load connection schemes other than the load balancing connection scheme in an ascending order of the variances of the loads of the APs, the alternative load connection schemes may be obtained by selecting a predetermined number of schemes whose variance is relatively small, or by selecting one or more schemes whose variance is less than a predetermined threshold.

When a connection between the UE and the AP corresponding to the UE established based on the load balancing connection scheme fails due to security factors, network configuration of the UE or the like, the AC may select one scheme from the alternative load connection schemes based on a feedback from the corresponding AP, and for example, the AC may select a scheme whose current variance is smallest, and sent the scheme to each AP, so that a connection between a UE and an AP corresponding to the UE is established based on the alternative load connection scheme. Thus, fault tolerance of the wireless LAN system increases, and load allocation efficiency of the system improves.

In the following, a specific example of the load balancing method according to an embodiment of the present invention will be described with reference to FIG. 3 to FIG. 10. FIG. 3 is a schematic diagram illustrating a connectivity matrix whose element is $Conn_{u,a}$ obtained by an AP according to an embodiment of the present invention, where rows UE31, UE32 . . . in the connectivity matrix denote user equipments (UEs) and columns AP21, AP22 . . . denote access points (APs). As mentioned above, in the connectivity matrix, 1 means that association is possible, and 0 means that association is impossible; accordingly, it is clearly seen from FIG. 3 that UE31 can be associated to AP21 and AP23, and UE 32 can be associated to AP 22 and AP 24. According to the meaning of the connectivity matrix, it may be implied that UE31 is actually located at a place where AP21 and AP23 intersect, and UE32 is actually located at a place where AP22 and AP24 intersect.

FIG. 4 is a schematic diagram illustrating a UE bandwidth vector whose element is $Bw_u$ according to an embodiment of the present invention, and numerical values in the UE bandwidth vector may be a relative value with a unified unit. As shown in FIG. 4, it can be seen that the relative value of the bandwidth occupied by UE31 is 4 units, and the relative value of the bandwidth occupied by UE32 is 5 units.

FIG. 5 is a schematic diagram illustrating an AP bandwidth capacity vector whose element is $Capa_a$ according to an embodiment of the present invention. Similarly, the bandwidth capacity vector is the same relative value with a unified unit as the UE bandwidth vector. It can be seen from FIG. 5 that AP21 has a bandwidth capacity of 30 units, AP22 also has a bandwidth capacity of 30 units, and AP23 has a bandwidth capacity of 20 units.

FIG. 6 is a schematic diagram illustrating a matrix whose element is $Alloc'_{u,a}$ formed after the AC collects the load information of the APs, and matrix is used for indicating current UE connection information. For example, as shown in FIG. 6, UE31 is connected to AP21 and occupies 4 bandwidth units. Similarly, UE32 is connected to AP22 and occupies 5 bandwidth units.

FIG. 7 is a schematic diagram illustrating a priority vector whose element is $Prior_u$ according to an embodiment of the present invention, and the priority vector is used for indicating priorities of the UEs. The priorities of the UEs that cannot be handed over such as UE31, UE33 and UE35 in the priority vector are set to high-priority High, and the priorities of other UEs are set to low-priority Low.

FIG. 8 is a schematic diagram illustrating a process of establishing a base matrix according to an embodiment of the present invention. As described above, elements in the base matrix may be denoted by $Base_{u,a}$, and may be obtained by multiplying bandwidth $Bw_u$ of the UE u by nonzero elements in a row corresponding to the UE u in the connectivity matrix Conn. As shown in FIG. 8, corresponding rows of the base matrix corresponding to UE31 may be obtained by multiplying band4 occupied by UE31 by a row vector corresponding to UE31 in the connectivity matrix, and UE32, UE33 and UE34 may be obtained similarly to U31.

FIG. 9 is a schematic diagram illustrating a process of modifying a base matrix based on a priority vector in a case where high-priority UEs exist according to an embodiment of the present invention. In this example, UE31, UE33 and UE35 are the high-priority UEs, accordingly, rows corresponding to UE31, UE33 and UE35 may be deleted from the original base matrix, and corresponding rows in the matrix Alloc' shown in FIG. 6 may be inserted. Then, as shown by arrows in FIG. 9, the rows corresponding to UE31, UE33 and UE35 are moved to the top of the base matrix, so as to prevent the connection statuses of these UEs being changed in a subsequent enumeration process. Alternatively, in order to simplify the calculation step, the corresponding bandwidths occupied by the high-priority UE31, UE33 and UE35 may be subtracted from the AP bandwidth capacity in the vector Residue in the upper portion of FIG. 9. Here, initial values of elements in the vector may be $Residue_a=Capa_a$. For example, UE31 occupies 4 bandwidth units in AP21, accordingly 4 units may be subtracted from initial 30 units of bandwidth capacity of AP21 as shown in the vector above the right side of the matrix in FIG. 9, and it becomes 26 units. Similarly, 3 units occupied by UE33 may be subtracted from 30 units of bandwidth capacity of AP22 and it becomes 27 units, and 5 units occupied by UE35 may be subtracted from 30 units of bandwidth capacity of AP24 and it becomes 25 units.

By the configuration of the base matrix, the final scheme can satisfy a constraint condition of the connectivity matrix, each UE can be connected, and some situations that association is impossible (for example, UE32 cannot be connected to AP21) can be ignored. Therefore, the enumeration space of the algorithm decreases, and computation efficiency improves. Specifically, by merely enumerating nonzero terms in the matrix, not only it is possible to guarantee that all UEs can be connected to the corresponding APs based on the final load balancing connection scheme, but also the high-priority UE can be guaranteed not to be handed over.

FIG. 10 is a schematic diagram illustrating an enumeration process based on a constructed base matrix according to an embodiment of the present invention. The enumeration process shown in FIG. 10 is performed based on the modified base matrix shown on the right side of FIG. 9. Considering the top three rows are occupied by the high-priority UEs as described above, the enumeration process in the embodiment of the present invention starts from the fourth row corresponding to UE32 of the modified base matrix. First, supposing that UE32 is connected to AP22 and the bandwidth occupied by UE32 is 5, it calculated whether AP22 becomes overloaded after 5 bandwidth units have been occupied by UE32. If overload does not occur (the bandwidth of AP22 changes to 27−5=22>0 as shown by the intermediate matrix in FIG. 10), UE34 will be considered, and each nonzero element in the row corresponding to UE34 is enumerated (first considering that UE34 is connected to AP21 as shown by the matrix on the right side of FIG. 10, and subtracting one bandwidth unit from bandwidth 26 of AP21, thereby becoming 25), and so on.

In another embodiment of the present invention, when AP22 is overloaded, it may be assumed that UE32 is connected to AP24 based on another nonzero element of the row corresponding to UE32 in the base matrix, and enumeration may be performed in a similar manner.

On the other hand, when all of the nonzero elements in a specific UE are overloaded as a result of the enumeration, another nonzero element other than all of the selected nonzero elements is selected from a row corresponding to an allocated UE immediately before the specific UE, and the enumeration process is restarted.

In the embodiment of the present invention, the enumeration process may be performed one row by one row based on the above algorithm, until all connection statuses of the UEs has been enumerated to the bottom of the matrix. The algorithm may be recursively implemented to obtain all available load connection schemes.

After obtaining all available load connection schemes, variances of the loads of the APs may be calculated for each scheme, and the schemes may be sorted in an ascending order of the variances. A scheme whose variance is smallest or a scheme whose average value of loads is smallest may be selected as the load balancing connection scheme. However, the present invention is not limited to these examples, any method that can balance the loads of the APs (such as a minimum mean difference) may be applied to the present invention.

According to the load balancing method of the embodiment of the present invention, it is possible to obtain the load balancing connection scheme by using the load status association information of the APs in the wireless LAN. The load status association information of the embodiment of the present invention includes connectivity information indicating whether the UEs can be connected to the APs, thus by using the load balance connection scheme generated based on the load status association information in the present invention, it can be guaranteed that all of the UEs can be effectively connected to the corresponding AP in the wireless LAN, and load balancing can be optimized over a global area.

[Access Controller]

Figure 11:
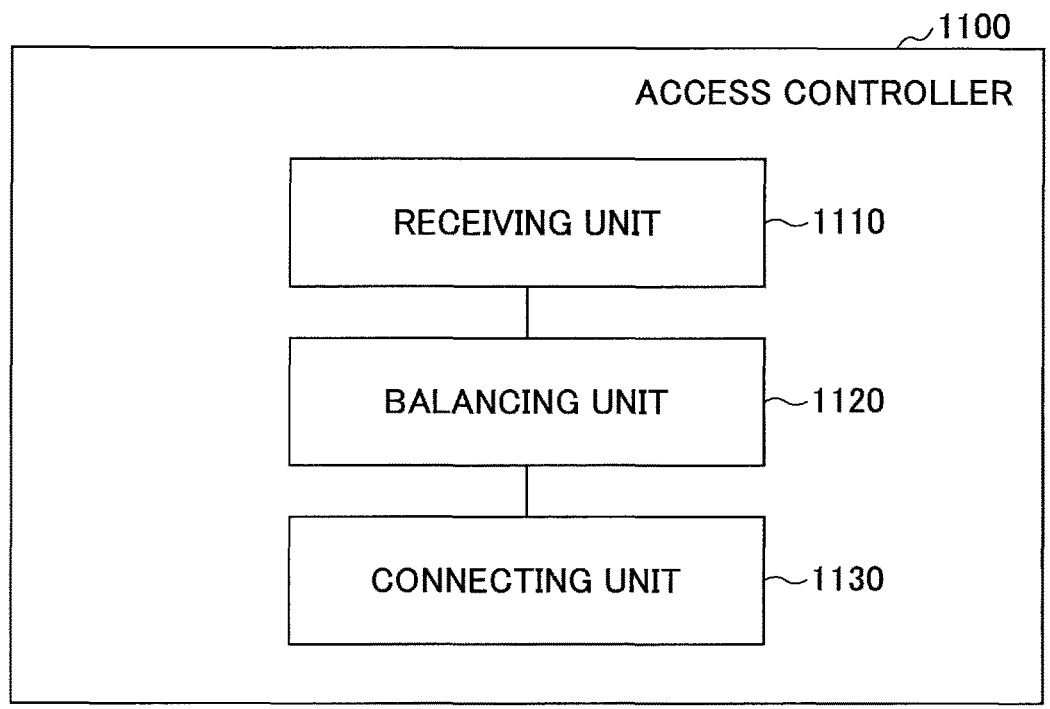
FIG. 11 is a block diagram illustrating an access controller according to an embodiment of the present invention.

In the following, an access controller according to an embodiment of the present invention will be described with reference to FIG. 11. FIG. 11 is a block diagram illustrating an access controller 1100 according to an embodiment of the present invention. As shown in FIG. 11, the access controller 1100 includes a receiving unit 1110, a balancing unit 1120, and a connecting unit 1130. The access controller 1100 may further include other parts, but these parts are irrelevant to the contents of the embodiments of the present invention, so that illustration and description are omitted here. In addition, since the details of the following operations performed by the access controller 1100 according to the embodiment of the present invention are the same as the details described with reference to FIGS. 2 to 10, duplicate descriptions for the same details are omitted.

The receiving unit 1110 of the access controller 1100 in FIG. 11 receives load status association information from a plurality of wireless APs in a wireless local area network, respectively. The load status association information includes load information and connectivity information. The connectivity information is information for indicating one or more UEs that can be connected to an AP corresponding to the load status association information.

The receiving unit 1110 receives load status association information related to each of the APs that transmitted by the AP. The interaction of information between the AC and the APs may be wireless or wired, and the interaction of the information may be realized via control frames of interaction. Preferably, considering that data stream in the wireless LAN may be unstable, the interaction of the information between the AC and the APs may be performed periodically, and a period is determined based on an actual usage scene and a specific distribution situation of the wireless LAN.

In the present embodiment, the load status association information transmitted by the AP includes the load information and the connectivity information. The connectivity information is information for indicating one or more UEs that can be connected to an AP corresponding to the load status association information. The connectivity information may be collected by the information interaction between the APs and the UEs. In the same wireless LAN, the connectivity information may be obtained by considering signal intensities of the APs and access capabilities of the UEs in the wireless LAN, and may vary with the change of positions, statuses or the like of the UEs. The AP transmits, to the AC, the obtained information of UEs that can be connected to the AP, and the information of the UEs transmitted by the AP may be identification information of the UEs (such as an IMEI, a MAC address or the like). Accordingly, the receiving unit 1110 of the AC collects the information of the UEs that can be connected to the AP transmitted by all of the APs, and expresses the collected connectivity information by a connectivity matrix whose element is $Conn_{u,a}$, where u denotes a specific UE and a denotes a specific AP. For example, the connectivity matrix may be a matrix whose size is $|U| \times |A|$ and matrix element is 0 or 1, where A denotes a set of wireless access points a whose size is $|A|$, and U denotes a set of user equipments u whose size is $|U|$. As known from the following formula, the matrix element $Conn_{u,a}$ indicates whether a current UE can be associated to a corresponding AP.

$$Conn_{u,a} = \begin{cases} 1, & UE\ u\ \text{CAN BE ASSOCIATED TO}\ AP\ a \\ 0, & UE\ u\ \text{CANNOT BE ASSOCIATED TO}\ AP\ a \end{cases}$$

Preferably, the load information may include at least one of bandwidth occupied by one or more UEs in an AP corresponding to the load information, respectively, a bandwidth capacity of the AP, and current UE connection information. The current UE connection information indicates information of one or more UEs who currently establish connection with the AP. Since the load information collected by the AP is a load status at a certain time, the bandwidth occupied by the UE and the current UE connection information in the load information may vary based on a collection time of the load information.

Preferably, the bandwidth occupied by the UE may be denoted by $Bw_u$, and the bandwidth capacity provided by the AP a may be denoted by $Capa_a$. $Bw_u$ and $Capa_a$ may be relative values whose units are mutually unified. The AP obtains the bandwidth of a current UE based on the network usage status of the UE, and may report the bandwidth together with the own bandwidth capacity to the AC. The bandwidths of the UEs collected by the receiving unit 1110 of the AC may be expressed by a UE bandwidth vector whose element is $Bw_u$, and the collected bandwidth capacities of the APs may be expressed by a bandwidth capacity vector whose element is $Capa_a$. The bandwidth capacity vector may be used to detect whether the AP is overloaded.

Preferably, the APs transmit the information of the currently associated UEs to the AC, and the receiving unit 1110 of the AC aggregates the information, and generates, based on the aggregated information and the UE bandwidth information, a matrix whose element is $Alloc'_{u,a}$ for indicating the current UE connection information.

$$Alloc'_{u,a} = \begin{cases} Bw_u, & UE\ u\ \text{IS ASSOCIATED TO}\ AP\ a \\ 0, & UE\ u\ \text{IS NOT ASSOCIATED TO}\ AP\ a \end{cases}$$

In another embodiment of the present invention, the load information may also include priority information of one or more UEs. The priority information indicates whether the UE is a high-priority UE with a high priority. For example, when a UE uses an important network application such as a network video conference, the current UE may be set as a high-priority UE, and the UE cannot be handed over from an AP to which the UE is connected during a subsequent load balancing process, so that the user experience cannot be greatly affected. Such information may be collected and determined by the AP using any types of methods, such as negotiation between the AP and the UE, an access request type of the current UE, an type of an equipment or an application used by the UE or the like. Preferably, the priority information of the UE u may be denoted by $Prior_u$, the priority information of the UEs collected by the AC may be expressed by a priority vector whose element is $Prior_u$. It is not permitted to handover a UE with a high-priority High.

$$Prior_u = \begin{cases} High, & \text{UE } u \text{ CANNOT BE HANDED OVER TO ANOTHER } AP \\ Low, & \text{UE } u \text{ CAN BE HANDED OVER TO ANOTHER } AP \end{cases}$$

The balancing unit 1120 of the AC determines load statuses of the APs based on the load status association information, and obtains a load balancing connection scheme for balancing loads of the APs using the load status association information, when the load statuses satisfy a predetermined condition.

The balancing unit 1120 of the AC may determine the load statuses of the APs based on a global association status of the wireless network obtained using the collected load status association information, and determine whether recalculate the load balancing connection scheme in the network. Preferably, the balancing unit 1120 of the AC may determine whether recalculate load connection based on a relation between the current UE connection information $Alloc'_{u,a}$ and the bandwidth capacity of the AP $Capa_a$. For example, it may be determined that an AP a is already overloaded, and the load balancing connection scheme in the network may be recalculated, when the AP a satisfies a predetermined condition $\Sigma_{u \in U} Alloc'_{u,a} > Capa_a$; and no operation need to be performed, when the AP a is not overloaded. In this way, overhead of UE handover and load balance can be balanced. Note that the above condition may be set based on the actual network situation. For example, the load connection of the wireless network may be recalculated, when a predetermined condition that the load of an AP a is greater than 90% of the bandwidth capacity thereof is satisfied. Alternatively, the load connection of the wireless network may be recalculated, when the load of an AP a is greater than 80% of the bandwidth capacity thereof and the load of an AP b is greater than 80% of the bandwidth capacity thereof.

In an embodiment of the present invention, when the balancing unit 1120 determines that it is necessary to recalculate the load connection of the wireless network, a base matrix may be established using the load status association information, and all available load connection schemes may be enumerated based on a predetermined constraint condition. Elements in the base matrix may be denoted by $Base_{u,a}$, and may be obtained by multiplying bandwidth $Bw_u$ of the UE u by a nonzero vector in a row corresponding to the UE u in the connectivity matrix Conn.

After generating the base matrix, the balancing unit 1120 may enumerate all nonzero elements in the base matrix to obtain the available load connection scheme Alloc. The available load connection scheme is essentially a $|A| \times |U|$ matrix whose element $Alloc_{u,a}$ expresses a bandwidth currently occupied by the UE u on the AP a. From the above relation between the AP and the UE, it can be known that there is only at most one nonzero element for a row corresponding to each UE in the matrix.

In the enumeration process, it is necessary to set the predetermined constraint condition based on the connectivity information in the load status association information, so that the generated available load connection scheme can be used for association of all of the UEs. Accordingly, for an element $Alloc_{u,a}$ in an available load connection scheme corresponding to UE u and AP a, the predetermined constraint condition may be $\forall u \in U, a \in AP \wedge Alloc_{u,a} \neq 0, Conn_{u,a} = 1$.

Furthermore, when there is a high-priority UE, the balancing unit 1120 may modify the basic matrix based on the priority vector, and perform the enumeration. Specifically, a row corresponding to the high-priority UE may be deleted from the base matrix; and a row corresponding to the high-priority UE may be copied from the Alloc' matrix and be inserted into the base matrix, and preferably it may be inserted into the top of the base matrix. The available load connection scheme is required to retain connection between the high-priority UE and an AP that currently connected to the UE; accordingly, in the process of enumeration calculation, in order to guarantee stable and sustainable connection and use of the high-priority UE in the wireless LAN, a search is performed based on the modified base matrix without changing the AP connected to the high-priority UE and the bandwidth occupied by the high-priority UE in the Alloc, namely the search is performed without changing the row inserted from the Alloc'. In an embodiment of the present invention, in order to simplify the calculation step, the calculation may be performed after subtracting the corresponding bandwidth occupied by the high-priority UE from the AP bandwidth capacity. Accordingly, the constraint condition based on the priority may be expressed as $\forall u \in U \wedge Prior_u = High, Alloc_{u,a} = Alloc'_{u,a}$.

The enumeration of the available load connection scheme is completed based on the base matrix (or transform of the above base matrix). The balancing unit 1120 may store and allocate the remaining bandwidth excluding the bandwidth occupied by the high-priority UE (in the case where the high-priority UE exists) using a temporary vector Residue with |A| elements $Residue_a$, and an initial value of an element in the vector may be set as $Residue_a = Capa_a$.

Specifically, in an embodiment of the present invention, the enumeration process used by the balancing unit 1120 for searching all of the available load connection schemes may be as follows. For each of UE u, an AP a is selected under a condition that $Base_{u,a} \neq 0$, a value of an element in the vector Residue is set as $Residue'_a = Residue_a - Base_{u,a}$. If $Residue'_a \geq 0$, then proceed to enumerate a next UE u'. Otherwise, another AP a' is selected under a condition that $Base_{u,a'} \neq 0$, and it is verified whether $Residue'_a \geq 0$ where $Residue'_a = Residue_a - Base_{u,a'}$, and so on. If no nonzero element corresponding to the UE u that satisfies the above condition from the base matrix, then return to a row corresponding to the previous UE u", and select another nonzero element that is different from all of the nonzero elements in the currently selected u" row (namely a recursion process).

After all of the available load connection schemes are obtained, the balancing unit 1120 may select the load balancing connection scheme for balancing loads of the APs. Preferably, a variance of the loads of the APs for each of the available load connection schemes may be calculated, the available load connection schemes may be sorted in an ascending order of the variances, and a load connection scheme whose variance is smallest may be selected as the load balancing connection scheme. Alternatively, an average value of the loads of the APs for each of the available load connection schemes may be calculated, and a load connection scheme whose average value of loads is smallest may be selected as the load balancing connection scheme.

The load balancing algorithm used by the balancing unit 1120 of the embodiments of the present invention may not depend on a protocol such as 802.11, so as to fit well with another load balance scheme based on access control.

The connecting unit 1130 determines a correspondence relation between a specific UE and one of the plurality of APs based on the load balancing connection scheme, so that a connection between a UE in the wireless LAN and an AP corresponding to the UE is established.

As described above, the load balancing connection scheme is a matrix indicating current bandwidth occupation of UEs u on an AP a, and there is only at most one nonzero element in a row corresponding to each UE in the matrix. After obtaining the load balancing connection scheme, the connecting unit 1130 may determine a correspondence relation between a specific UE and one of the plurality of APs based on the load balancing connection scheme and send a vector corresponding to each AP to the AP, and the vector indicates information of UEs connected to each AP designated by the connecting unit 1130 of the AC, and bandwidths occupied by the UEs. The AP establishes a connection between a specific UE based on the indicated connection information, after receiving the corresponding vector of the load balancing connection scheme sent by the connecting unit 1130.

In an embodiment of the present invention, the connecting unit 1130 may also select one or more load connection schemes in an ascending order of the variances from the available load connection schemes other than the load balancing connection scheme, serving as alternative load connection schemes. After sorting the available load connection schemes other than the load balancing connection scheme in an ascending order of the variances of the loads of the APs, the alternative load connection schemes may be obtained by selecting a predetermined number of schemes whose variance is relatively small, or by selecting one or more schemes whose variance is less than a predetermined threshold.

When a connection between the UE and the AP corresponding to the UE established based on the load balancing connection scheme fails due to security factors, network configuration of the UE or the like, the connecting unit 1130 may select one scheme from the alternative load connection schemes based on a feedback from the corresponding AP, and for example, the AC may select a scheme whose current variance is smallest, and sent the scheme to each AP, so that a connection between a UE and an AP corresponding to the UE is established based on the alternative load connection scheme. Thus, fault tolerance of the wireless LAN system increases, and load allocation efficiency of the system improves.

According to the access controller of the embodiment of the present invention, it is possible to obtain the load balancing connection scheme by using the load status association information of the APs in the wireless LAN. The load status association information of the embodiment of the present invention includes connectivity information indicating whether the UEs can be connected to the APs, thus by using the load balance connection scheme generated based on the load status association information in the present invention, it can be guaranteed that all of the UEs can be effectively connected to the corresponding AP in the wireless LAN, and load balancing can be optimized over a global area.

[Load Balancing System]

Figure 12:
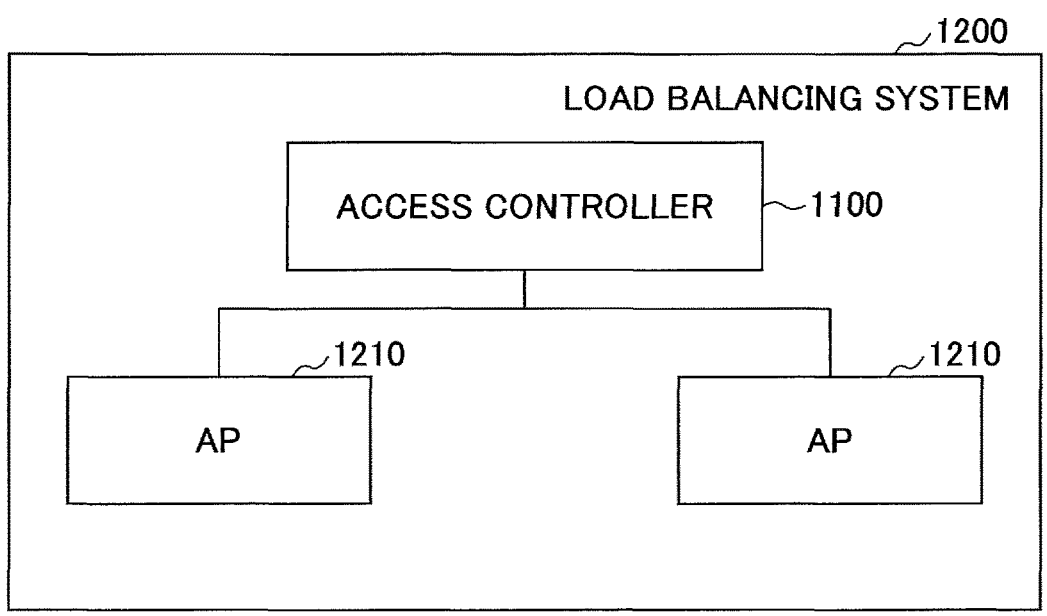
FIG. 12 is a block diagram illustrating a load balancing system according to an embodiment of the present invention.

In the following, a load balancing system according to an embodiment of the present invention will be described with reference to FIG. 12. FIG. 12 is a block diagram illustrating a load balancing system 1200 according to an embodiment of the present invention. As shown in FIG. 12, the load balancing system 1200 includes the access controller 1100 and a plurality of APs 1210 (as an example, two APs are shown in FIG. 12). The load balancing system 1200 may further include other parts. In addition, since the details of the following operations performed by the load balancing system 1200 according to the embodiment of the present invention are the same as the details described with reference to FIG. 11, duplicate descriptions for the same details are omitted.

The access controller 1100 in the load balancing system 1200 according to the embodiment of the present invention receives load status association information from a plurality of wireless access points (APs) in a wireless local area network, respectively. The load status association information includes load information and connectivity information, and the connectivity information is information for indicating one or more user equipments (UEs) that can be connected to an AP corresponding to the load status association information. The access controller 1100 in the load balancing system 1200 according to the embodiment of the present invention determines load statuses of the APs based on the load status association information, and obtains a load balancing connection scheme for balancing loads of the APs using the load status association information, when the load statuses satisfy a predetermined condition. The access controller 1100 in the load balancing system 1200 according to the embodiment of the present invention determines a correspondence relation between a specific UE and one of the plurality of APs based on the load balancing connection scheme, so that a connection between a UE in the wireless local area network and an AP corresponding to the UE is established.

The AP 1210 in the load balancing system 1200 according to the embodiment of the present invention sends, to the access controller 1100, load status association information including connectivity information related to the AP 1210; and establishes a connection with corresponding UEs based on the load balancing connection scheme sent from the access controller 1100.

According to the load balancing system of the embodiment of the present invention, it is possible to obtain the load balancing connection scheme by using the load status association information of the APs in the wireless LAN. The load status association information of the embodiment of the present invention includes connectivity information indicating whether the UEs can be connected to the APs, thus by using the load balance connection scheme generated based on the load status association information in the present invention, it can be guaranteed that all of the UEs can be effectively connected to the corresponding AP in the wireless LAN, and load balancing can be optimized over a global area.

The present invention is not limited to the specifically disclosed embodiments, and various modifications, combinations and replacements may be made without departing from the scope of the present invention.

What is claimed is:

1. A load balancing method applied to an access controller, the load balancing method comprising:

receiving load status association information from each wireless access point of a plurality of wireless access points in a wireless local area network, the load status association information including load information and connectivity information, and the connectivity information indicating one or more user devices that can be connected to a wireless access point of the plurality of wireless access points corresponding to the load status association information;

determining, based on the load status association information, load statuses of the plurality of wireless access points, and obtaining, using the load status association information, a load balancing connection scheme for balancing loads of the plurality of wireless access points, when the load statuses satisfy a predetermined condition; and determining, based on the load balancing connection scheme, a correspondence relation between a specific user device and one of the plurality of wireless access points, so that a connection between the specific user device in the wireless local area network and the one wireless access point corresponding to the specific user device is established, wherein the load information includes priority information of the specific user device connected to the one wireless access point corresponding to the load information, the priority information indicating whether the specific user device is a high-priority user device, and in the obtained load balancing connection scheme, a connection between the specific user device and the one wireless access point corresponding to the load information is retained in a case where the priority information indicates that the specific user device is a high-priority user device.

2. The load balancing method according to claim 1, wherein the load status association information is periodically received from each wireless access point of the plurality of wireless access points in the wireless local area network.

3. The load balancing method according to claim 1, wherein the load information includes at least one of bandwidth occupied by the one or more user devices connected to the one wireless access point corresponding to the load information, respectively, a bandwidth capacity of the one wireless access point, and current user device connection information, and the current user device connection information indicates information of one or more users devices currently connected with the one wireless access point.

4. The load balancing method according to claim 1, wherein the load statuses satisfy the predetermined condition in a case where the loads of the plurality of wireless access points exceed bandwidth capacities of the plurality of wireless access points.

5. The load balancing method according to claim 1, wherein the obtaining of the load balancing connection scheme for balancing the loads of the plurality of wireless access points using the load status association information includes enumerating all available load connection schemes that satisfy a predetermined constraint condition obtained based on the connectivity information; and calculating, for each of the available load connection schemes, a variance of the loads of the plurality of wireless access points, and selecting the load connection scheme whose variance is smallest from among the available load connection schemes to serve as the load balancing connection scheme.

6. The load balancing method according to claim 5, the load balancing method further comprising:

selecting, from the available load connection schemes other than the selected load balancing connection scheme, one or more alternative load connection schemes based on an ascending order variance; and selecting, from the one or more alternative load connection schemes, an alternative load connection scheme whose variance is smallest, so that a connection between the user device and the wireless access point corresponding to the user device is established based on the alternative load connection scheme, in a case where a connection between the user device and the wireless access point corresponding to the user device established based on the load balancing connection scheme fails.

7. An access controller comprising:

a processor; and a memory storing program instructions that cause the processor to:

receive load status association information from each wireless access point of a plurality of wireless access points in a wireless local area network, the load status association information including load information and connectivity information, and the connectivity information indicating one or more user devices that can be connected to a wireless access point of the plurality of wireless access points corresponding to the load status association information;

determine, based on the load status association information, load statuses of the plurality of wireless access points, and obtain, using the load status association information, a load balancing connection scheme for balancing loads of the plurality of wireless access points, when the load statuses satisfy a predetermined condition; and determine, based on the load balancing connection scheme, a correspondence relation between a specific user device and one of the plurality of wireless access points, so that a connection between the specific user device in the wireless local area network and the one wireless access point corresponding to the specific user device is established, wherein the load information includes priority information of the specific user device connected to the one wireless access point corresponding to the load information, the priority information indicating whether the specific user device is a high-priority user device, and in the obtained load balancing connection scheme, a connection between the specific user device and the one wireless access point corresponding to the load information is retained in a case where the priority information indicates that the specific user device is a high priority user device.

8. A load balancing system comprising:

a processor;

a memory storing program instructions that cause the processor to:

receive load status association information from each wireless access point of a plurality of wireless access points in a wireless local area network, the load status association information including load information and connectivity information, and the connectivity information indicating one or more user devices that can be connected to a wireless access point of the plurality of wireless access points corresponding to the load status association information, determine, based on the load status association information, load statuses of the plurality of wireless access points, and obtain, using the load status association information, a load balancing connection scheme for balancing loads of the plurality of wireless access points, when the load statuses satisfy a predetermined condition, and determine, based on the load balancing connection scheme, a correspondence relation between a specific user device and one of the plurality of wireless access points, so that a connection between the specific user device in the wireless local area network and the one wireless access point corresponding to the specific user device is established, wherein the load information includes priority information of the specific user device connected to the one wireless access point corresponding to the load information, the priority information indicating whether the specific user device is a high-priority user device, and in the obtained load balancing connection scheme, a connection between the specific user device and the one wireless access point corresponding to the load information is retained in a case where the priority information indicates that the specific user device is a high priority user device; and the plurality of wireless access points.

* * * * *